United States Patent
Tal et al.

[11] Patent Number: 5,973,273
[45] Date of Patent: Oct. 26, 1999

[54] METHOD FOR DETERMINING WEIGHT OF A VEHICLE IN MOTION

[75] Inventors: Reuven Tal, Kiron; Shalom Elad, Rishon Lezion, both of Israel

[73] Assignee: Controload Ltd., Tel Aviv, Israel

[21] Appl. No.: 09/034,570

[22] Filed: Mar. 4, 1998

[51] Int. Cl.[6] .............................. G01G 9/00; G01G 19/08
[52] U.S. Cl. .............................. 177/1; 177/136; 702/174; 73/580
[58] Field of Search .............................. 177/25.11, 25.12, 177/25.13, 25.14, 136, 137, 138, 139, 210 FP, 1; 702/101, 102, 173, 174, 175; 73/1.13, 580

[56] References Cited

U.S. PATENT DOCUMENTS

| | | | |
|---|---|---|---|
| Re. 26,826 | 3/1970 | Nolan | 177/137 |
| 3,453,870 | 7/1969 | Pickholtz | 73/580 |
| 3,508,623 | 4/1970 | Greenstein | 177/137 |
| 3,555,886 | 1/1971 | Thornton | 73/580 |
| 4,379,495 | 4/1983 | Cocks et al. | 177/1 |
| 4,511,966 | 4/1985 | Hamada | 354/200 |
| 4,696,181 | 9/1987 | Rupprecht et al. | 177/210 FP |
| 5,161,628 | 11/1992 | Wirth | 177/137 |

OTHER PUBLICATIONS

*Introduction to System Analysis*, T. H. Glisson, McGraw–Hill, Inc. pp. 222 & 224–245, 1985.

*Primary Examiner*—Randy W. Gibson
*Attorney, Agent, or Firm*—Mark M. Friedman

[57] ABSTRACT

A method for determining a total weight supported by the suspension system of a vehicle in motion starts by obtaining information sufficient to calculate a representative value of a spring constant for the suspension system of the vehicle. Measures are then obtained of the vertical acceleration of the center of mass of the vehicle over a period of time, and these are analyzed to identify a frequency of vertical oscillation of the vehicle. This frequency, together with the spring information, is used to determine an estimate of the total weight supported by the suspension system of the vehicle. Preferably, the measure of vertical acceleration is obtained by processing outputs of at least three motion sensors attached to the vehicle. In one embodiment, the motion sensors include one linear sensor deployed to measure vertical motion information for a part of the vehicle and two angular sensors deployed to measure pitch and roll information for the vehicle.

20 Claims, 5 Drawing Sheets

METHOD FOR DETERMINING WEIGHT OF A VEHICLE IN MOTION

FIELD AND BACKGROUND OF THE INVENTION

The present invention relates to weighing vehicles and, in particular, it concerns a system and corresponding method for determining a total weight of a vehicle in motion.

Vehicle weight is known to be a key parameter in road safety. Overloading of vehicles is often responsible for braking failures as well as roll-overs. Overloading also frequently results in shortening of the mean time between failures (MTBF) of various vehicle subsystems, leading to system malfunction and vehicle failures which may lead to accidents. Overloading is also a major cause of damage to road infrastructure.

Although a weight limit is set for every vehicle, the limit is not always observed. Limits may be exceeded either as a result of miss-estimation of the weight loaded into a vehicle, or through intentional overloading to reduce transportation costs. Most commonly, vehicle weight is measured by use of external scales or weigh-bridges. Although there are checkpoints for weighing trucks, they are of limited effectiveness. Firstly, since the checkpoints are positioned in a limited number of locations, such as before certain bridges, they can only monitor a small proportion of the possibly overweight vehicles. Additionally, checkpoints are inefficient, requiring considerable staffing and wasting valuable transport time. Finally, a system of checkpoints cannot provide advanced warning to the operator of the vehicle when he begins a journey with an overloaded vehicle.

In the case of aircraft, overload may cause fatal accidents during take-off or on subsequent center-of-gravity shift. Monitoring the total load of an aircraft is currently done through summation of the weights of several partial loads. In other words, the various loads are added together, either manually or by computer, to estimate the sum total of the weight. As well as the possibility of faulty addition, errors may be introduced during estimation of the weight of the fuel added to the aircraft's tanks, or through error or omission in estimation of the initial weight prior to loading, for example, if some load has mistakenly not been removed from the aircraft.

A number of systems have been proposed for on-board weighing of loaded vehicles. U.S. Pat. Nos. 4,158,396 and 4,580,644 teach methods of weight estimation using load cells built into the suspension system of a vehicle. Such methods are intrusive, requiring redesigning of part of the vehicle structure and cannot typically be retrofitted. These systems are also only operative under static conditions. An alternative system disclosed in U.S. Pat. No. 5,410,109 requires installation of a piezo-resistive transducer sensor at each vehicle suspension point. This suffers from similar limitations of requiring design modification and only operating under static conditions.

U.S. Pat. No. 4,588,038 discloses a system which can also weigh during motion of the vehicle. The system calculates the weight on each axle by measuring the air pressure in suspension cylinders. Variations due to motion of the vehicle are eliminated by calculating an average value of the measured weight over a period of time. This system also requires adaptation of the existing vehicle systems, making retrofitting difficult.

There is therefore a need for a non-intrusive, retrofitable system and corresponding method for determining a total weight of a vehicle in motion.

SUMMARY OF THE INVENTION

The present invention is a non-intrusive, retrofitable system and corresponding method for determining a total weight of a vehicle in motion.

The present invention may be employed for estimating and monitoring the weight of any type of wheeled vehicle, including but not limited to automobiles, buses, trucks, trailers, trains as well as aircraft on the wheels. The invention enables estimation of total vehicle and payload weight, without using any external source of information that could introduce errors.

The weight estimation may be performed continuously, and is first obtained within a very short time from any vehicle loading. The system output can be used for enforcing weight limitations by police or by road operators, and for self-check of the load by the vehicle driver. Real time remote monitoring of vehicle weight may be provided to enhance the effectiveness of law enforcement or other regulation. The system may also be used to provide a log of vehicle loading to be used for periodic maintenance, and to guard the interests of vehicle manufacturers against vehicle owners violating the warranty terms. Preferably, the system provides advance warning to the vehicle operator on initial operation of the vehicle under potentially dangerous overloaded conditions.

Thus, according to the teachings of the present invention there is provided, a method for determining a total weight supported by the suspension system of a vehicle in motion, the method comprising: (a) obtaining information sufficient to calculate a representative value of a spring constant for the suspension system of the vehicle; (b) obtaining measures of vertical motion for the center of mass of the total weight over a period of time; (c) analyzing the measures of vertical motion to identify a frequency of vertical oscillation of the total weight; and (d) determining from the frequency and the information an estimate of the total weight supported by the suspension system of the vehicle.

According to a further feature of the present invention, the measure of vertical motion is obtained by processing outputs of at least three motion sensors attached to the vehicle.

According to a farther feature of the present invention, the at least three motion sensors include one linear sensor deployed to measure vertical motion information for a part of the vehicle and two angular sensors deployed to measure pitch and roll information for the vehicle.

According to a further feature of the present invention, the at least three motion sensors include three linear acceleration sensors deployed to measure vertical acceleration at three non-collinear points on the vehicle.

According to a further feature of the present invention, the processing includes applying at least one notched filter.

According to a further feature of the present invention, the analyzing includes performing at least one Fourrier transform.

According to a further feature of the present invention, the information sufficient to calculate a representative value of a spring constant for the suspension system of the vehicle is obtained by a calibration process including: (a) determining a calibration weight supported by the suspension system of the vehicle by an alternative method; (b) obtaining measures of vertical motion for the center of mass of the calibration weight over a period of time; and (c) analyzing the measures of vertical motion to identify a frequency of vertical oscillation of the calibration weight.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
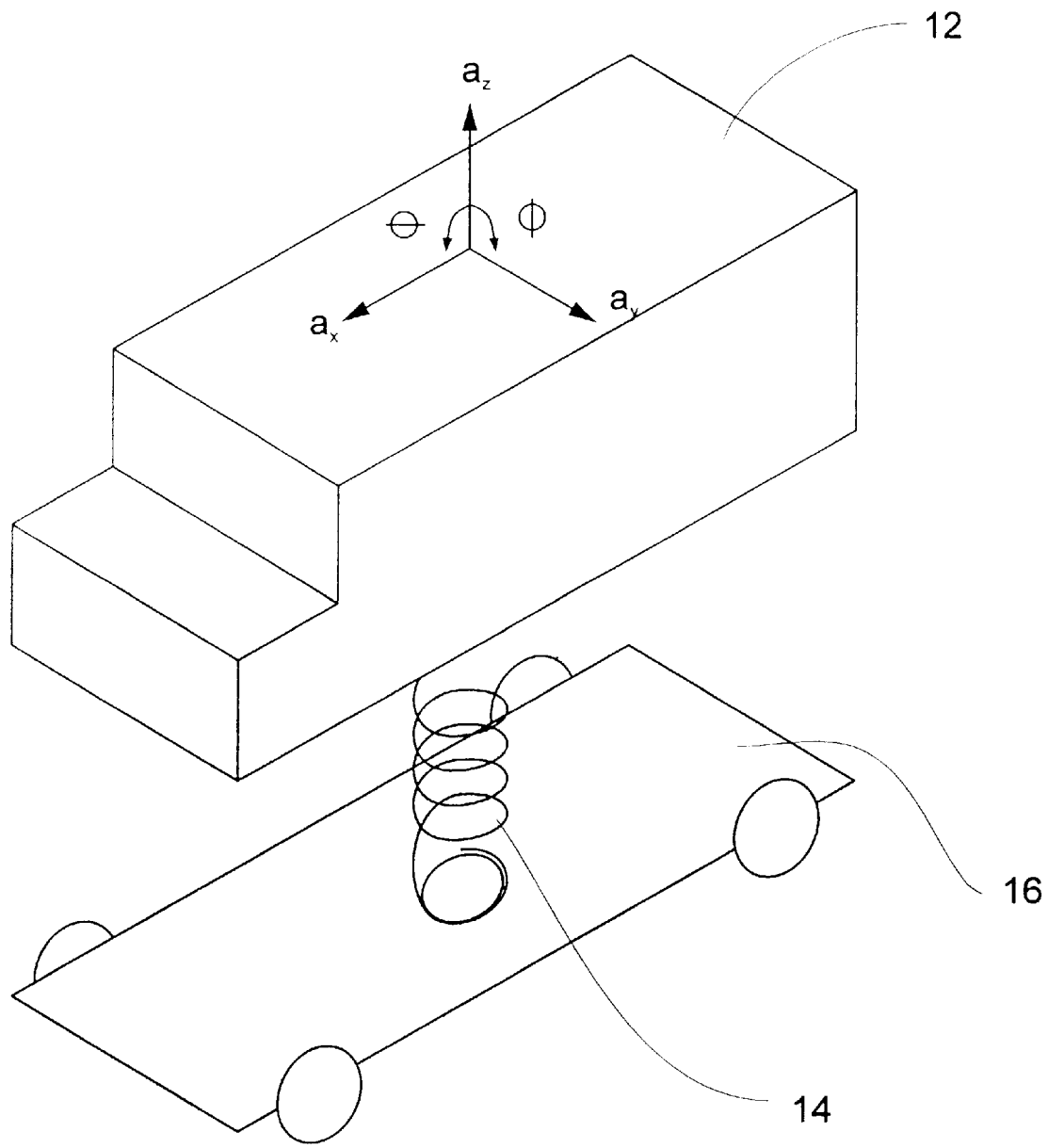
FIG. 1 is a schematic representation of the terminology used herein to describe the motion of a vehicle.

The present invention is a system and corresponding method for determining a total weight carried by the suspension system of a vehicle in motion.

The principles and operation of systems and methods according to the present invention may be better understood with reference to the drawings and the accompanying description.

Referring now to the drawings, FIGS. 1–4 illustrate a system 10 and corresponding method for determining a total weight carried by the suspension system of a vehicle 12 in motion.

The underlying principle of system 10 may be understood with reference to FIG. 1 in which vehicle 12 is shown to have components of instantaneous linear acceleration $a_x$, $a_y$ and $a_z$, and angular positions $\theta$ and $\phi$. It will be apparent that, for any vehicle traveling along the ground, components $a_x$ and $a_y$ are determined principally by the travel of the vehicle whereas $a_z$ results from the reaction of the vehicle suspension system to various shocks and impacts imparted by bumps in the ground and other stimuli. The response of the vehicle suspension system, including all suspension and shock-absorbing elements can be regarded as equivalent to a single theoretical spring 14 which has a representative value of a spring constant k for the entire suspension system of the vehicle plus appropriate damping. A lower portion of the vehicle 16, including the wheels, axles and certain other vehicle components, is not supported by spring 14.

From the theory of springs, it is known that the frequency of oscillation f of a load m supported by a spring is given by:

$$f = \frac{1}{2\pi}\sqrt{\frac{k}{m}}$$

Thus, once a representative spring constant has been determined, the total mass of the vehicle chassis and load can be expressed as a function of the frequency of oscillation as:

$$m = k\frac{1}{(2\pi f)^2}$$

By rewriting this relation for arbitrary measured reference values designated $m_0$ and $f_0$ and dividing one relation by the other, the mass can be expressed as:

$$m = m_0\left(\frac{f_0}{f}\right)^2$$

Thus, generally speaking, the method of the present invention involves obtaining information sufficient to calculate a representative value of a spring constant for the suspension system of the vehicle, for example reference values $m_0$ and $f_0$, and obtaining measures of the vertical acceleration of the center of mass of the vehicle over a period of time. The measures of the vertical acceleration are then analyzed to identify a frequency of vertical oscillation of the vehicle and this frequency, together with the spring, constant information, is used to determine an estimate of the total weight carried by the suspension system of the vehicle.

It will be immediately apparent that, unlike the devices of the prior art in which vehicle movement is an unwanted interference, the present invention measures the vehicle weight directly from the motion. Since calculations are based on the frequency of motion monitored over a period of time, the precision of measurements, and even systematic errors in the measurements, have little or no effect on the precision of the final results. The invention is therefore ideally suited to on-board weight measurement. Furthermore, since the invention does not attempt to measure weight directly, no modification of the existing suspension system is required. To the contrary, the solid body motion of the vehicle chassis can be measured by suitable sensors attached to any part of the vehicle chassis, thereby permitting unlimited positioning options for retrofit.

Parenthetically, it will be noted that the system and method do not directly determine the total weight of the entire vehicle and load. Instead, they determine the total weight supported by the suspension system of the vehicle. This differs from the total by the constant weight of the wheels, axles, part of the suspension system itself, and any other part of the vehicle directly mounted on the axles. The true total weight, or the net weight of the load alone, can easily be derived from the result by adding or subtracting a predetermined constant value to the derived weight.

Turning now to the features of system 10 in more detail, it will be clear that a basic implementation of the system could be achieved using a single acceleration sensor deployed for measuring vertical acceleration. However, in practice, the vertical acceleration measured at any point other than through the center of gravity is a sum of the true vertical acceleration together with the effects of pitch and roll oscillations. In order to derive the true vertical acceleration, one or two additional motion sensor inputs are preferably provided. Various combinations of sensors may be used to provide sufficient information. By way of example, two particular sensor combinations will be described here, the first with reference to FIGS. 2A–2C and the second below with reference to FIGS. 4A–4C.

Figure 2A:
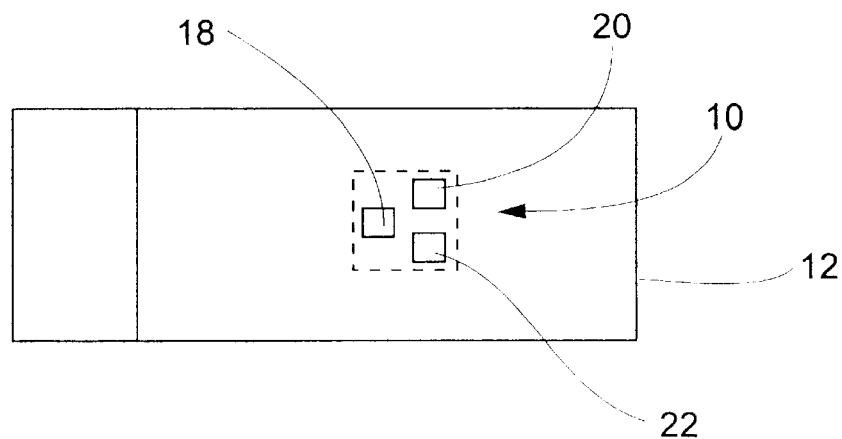
FIG. 2A is a schematic top view of a vehicle showing an arrangement of motion sensors for use in a first embodiment of a system and method for determining a total weight carried by the suspension system of the vehicle when in motion according to the teachings of the present invention.
Figure 2B:
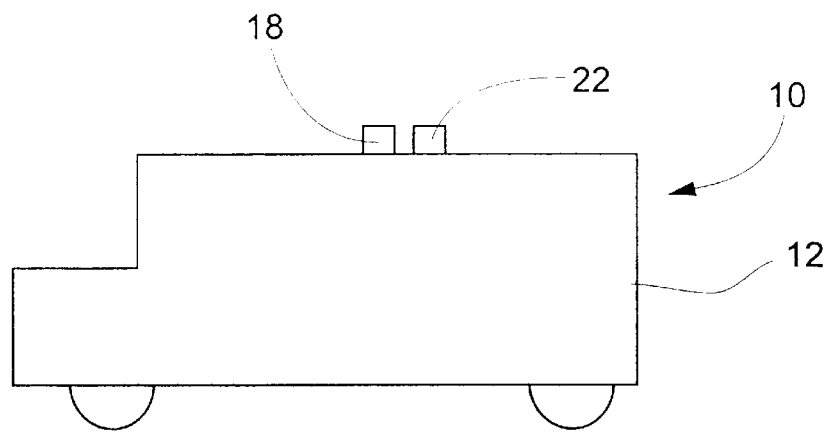
FIG. 2B is a schematic side view of the vehicle of FIG. 2A.
Figure 2C:
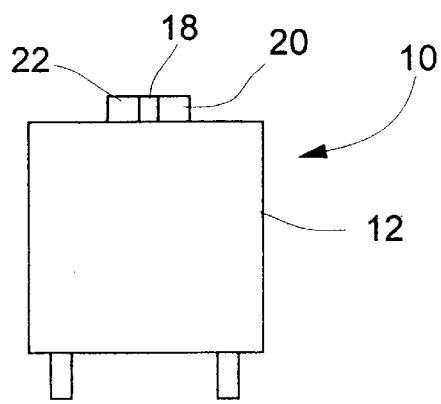
FIG. 2C is a schematic rear view of the vehicle of FIG. 2A.

FIGS. 2A–2C show a first sensor arrangement employing a single linear acceleration sensor 18 deployed to measure vertical acceleration of a part of the vehicle and two angular sensors 20, 22 deployed to measure pitch and roll information of the vehicle, respectively. Sensors 20 and 22 can be used to determine the frequencies of pitch and roll oscillations directly and these frequencies can be filtered out of vertical acceleration information. This embodiment allows all sensors to be combined into a single sensor unit located together on the vehicle.

It should be appreciated that the sensors employed in the present invention may be of a very wide range of types. The linear sensor may be direct acceleration sensors of any type, including but not limited to mechanical inertial and piezo-electric sensors. Alternatively, the linear sensor may measure other information from which oscillatory frequency can be derived, including vertical velocity or position relative to the road surface, axles or any other frame of reference not moving vertically with the chassis. Thus, further examples of sensors include, but are not limited to, laser, microwave, radar or ultrasonic range sensors measuring perturbations of vehicle chassis to ground distance and Magnetic or Hall Effect sensors installed to measure perturbations of vehicle chassis to wheel distance. All such sensors are referred to generically as "linear sensors".

Optionally, the type and design of sensor may be chosen to be sensitive only to relatively low frequency movements, for example responding to frequencies below about 5 or about 10 Hz. This avoids picking up the higher frequency vibrations caused by the vehicle engine or other higher frequency mechanical noise. Alternatively, such vibrations can be filtered out during later processing as will be described below.

With respect to the angular sensors, these too may be angular acceleration sensors, velocity sensors or displacement sensors of any conventional type, all such sensors being referred to generically as "angular sensors".

Figure 3:
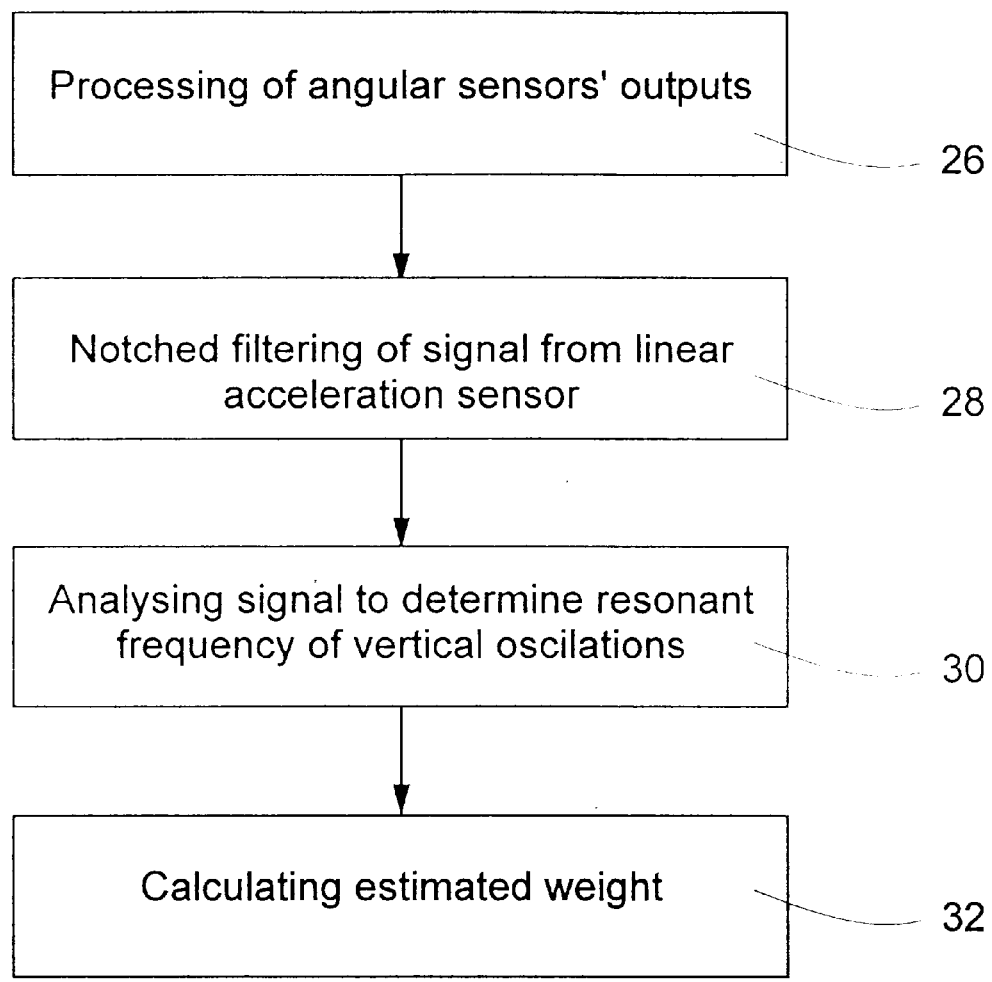
FIG. 3 is a block diagram illustrating operation of the system and method of the present invention.

FIG. 3 shows a block diagram of one possible processing sequence according to the present invention. First, after suitable pre-filtering where required, the outputs of angular sensors 20, 22 are processed (step 26) to derive resonant frequencies of pitch and roll oscillations. This may be simply achieved by Fourrier analysis followed by peak detection within a range appropriate to the vehicle in question. For a small domestic vehicle, such resonant frequencies are typically in the range between about 1 and about 5 Hz, whereas for a large, fully laden truck, lower frequencies are to be expected.

Then, at step 28, these resonant frequencies are used as inputs to adaptive notched filters for removing these frequencies from the signal provided by linear acceleration sensor 18. Pre-filtering of this signal, such as by a low pass filter, may also be performed at this stage. The signal is then analyzed (step 30), typically also by Fourrier analysis followed by peak detection, to determine a resonant frequency of vertical oscillations. An estimated weight supported by the suspension system of the vehicle is then calculated from the resonant frequency taken together with the predetermined spring properties of the suspension (step 32). This estimated weight may then be made available via a display directly to the driver, recorded electronically or otherwise in a vehicle log, serve as an input to other vehicle safety or control systems and/or may be transmitted immediately or at a later time to an external monitoring authority.

It will be noted that the present invention does not assume or require knowledge of the position of the vehicle's center of gravity. As a result, the "measures" of the vertical motion obtained are in fact scaled by some unknown factor, the true magnitude of vertical acceleration being not easily retrievable from the sensor outputs. Since, however, the invention depends only on measurements of the frequency of oscillations, the true magnitude of the acceleration is not critical.

When, on the other hand, a priori information about the motion or center of gravity of the vehicle is available, it may be possible to omit one or both of the angular sensors. For example, in the case of a liquid-filled tanker where the center of gravity can be assumed to always lie roughly on the longitudinal center-line of the vehicle, mounting of linear acceleration sensor 18 on or near the center-line may render roll sensor 22 unnecessary. A priori information about the motion may be available when the vehicle is actually standing stationary and the vertical oscillating motion is induced directly by an externally applied impulse.

As mentioned earlier, the weight calculation is based on some reference information sufficient to calculate a representative value of a spring constant for the suspension system of the vehicle. Typically, this information is in the form of a pair of reference values $m_0$ and $f_0$ obtained through a calibration process as follows.

First, a calibration weight $m_0$ of the part of the vehicle 12 supported by the suspension system is determined by a theoretical calculation based on vehicle part specifications, or equivalent information provided by the manufacturer.

Measures are then obtained of the vertical motion of the center of mass of the vehicle over a period of time, and these are analyzed to identify a calibration frequency $f_0$ of vertical oscillation of the vehicle. This is preferably achieved by executing steps 26, 28 and 30 described above. Optionally, the values $m_0$ and $f_0$ may be used to calculate a representative value of the spring constant for the vehicle suspension system, or a scaled value thereof, for use in the subsequent calculations.

It is particularly advantageous to choose the unloaded state of the vehicle for the calibration process. This allows provision of a user-operated reset feature to be actuated periodically when the vehicle is unloaded. The reset checks, and if necessary changes, the stored value of the calibration frequency $f_0$ to correct for variations due to wear in the suspension system. Additionally, by analyzing records kept of variations in the calibration frequency over an extended period, the system can be programmed to detect and provide warning of deterioration of the suspension system or sudden changes which may be indicative of a dangerous fault.

Figure 4A:
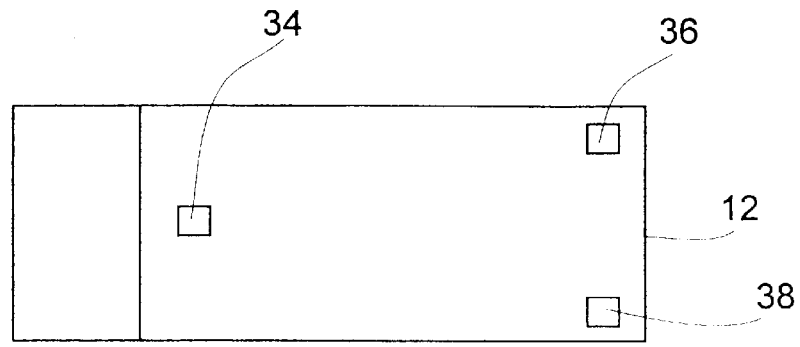
FIG. 4A is a schematic top view of a vehicle showing an arrangement of motion sensors for use in a second embodiment of a system and method for determining a total weight carried by the suspension system of the vehicle when in motion according to the teachings of the present invention.
Figure 4B:
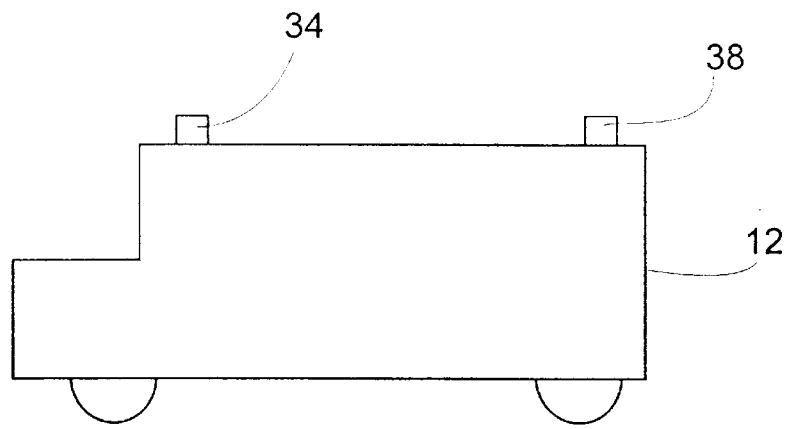
FIG. 4B is a schematic side view of the vehicle of FIG. 4A.
Figure 4C:
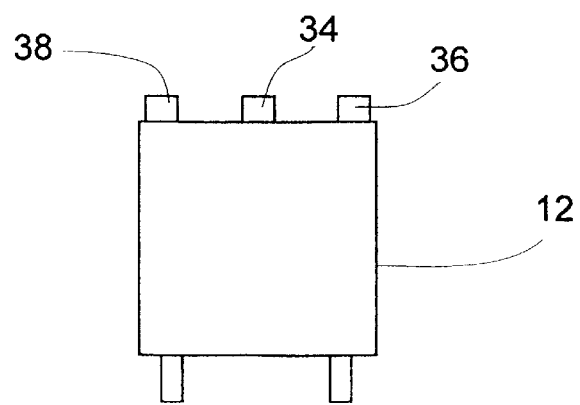
FIG. 4C is a schematic rear view of the vehicle of FIG. 4A.
Figure 5A:
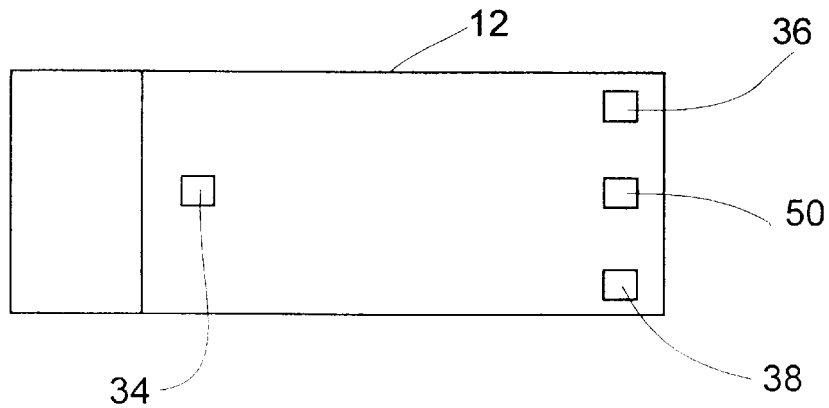
Figure 5B:
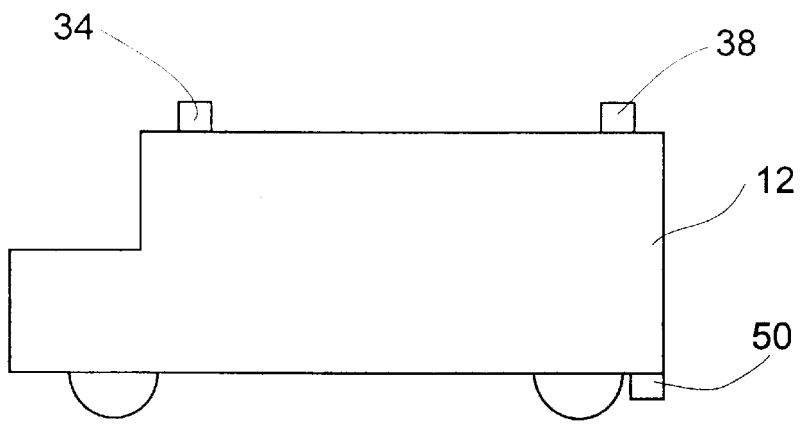
Figure 5C:
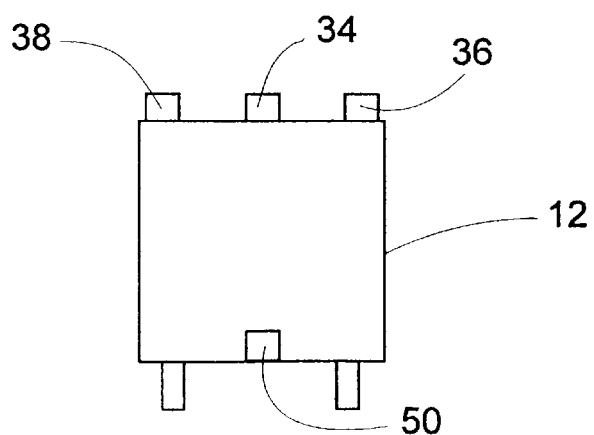

Turning now to FIGS. 4A–4C, these show an alternative sensor arrangement employing three linear acceleration sensors 34, 36 and 38 deployed to measure vertical acceleration designated $a_1$, $a_2$, $a_3$, respectively, at three non-collinear points on vehicle 12.

Clearly the exact form of analysis of the sensor outputs depends on their positioning, but in any case, the three measurements can be transformed into the equivalent of the vertical acceleration $a_v$, pitch acceleration $\ddot{\theta}$ and roll acceleration $\emptyset$ measured or calculated from sensors outputs in the first embodiment. In the case shown here, pitch oscillations will affect sensors 36 and 38 in a like manner opposite to the affect on sensor 34. Roll, on the other hand, will generate opposite outputs in sensors 36 and 38, while sensor 34 is relatively unaffected by roll. Thus, ignoring scaling factors and assuming small angles:

$$a_1 = a_v - \theta$$

$$a_2 = a_v + \theta + \emptyset$$

$$a_3 = a_v + \theta - \emptyset$$

In all other respects, the implementation of the method and system remain similar to those of the first embodiment.

It will be appreciated that the above descriptions are intended only to serve as examples, and that many other embodiments are possible within the spirit and the scope of the present invention.

What is claimed is:

1. A method for determining a total weight supported by the suspension system of a vehicle in motion, the method comprising:
   (a) obtaining information sufficient to calculate a representative value of a spring constant for the suspension system of the vehicle;
   (b) obtaining measures of vertical motion for the center of mass of the total weight resulting from normal motion of the vehicle over a period of time;
   (c) analyzing said measures of vertical motion to identify a frequency of vertical oscillation of the total weight; and
   (d) determining from said frequency and said information an estimate of the total weight supported by the suspension system of the vehicle.

2. The method of claim 1, wherein said measure of vertical motion is obtained by processing outputs of at least three motion sensors attached to the vehicle.

3. The method of claim 2, wherein said at least three motion sensors include one linear sensor deployed to measure vertical motion information for a part of the vehicle and two angular sensors deployed to measure pitch and roll information for the vehicle.

4. The method of claim 2, wherein said at least three motion sensors include three linear acceleration sensors deployed to measure vertical acceleration at three non-collinear points on the vehicle.

5. The method of claim 2, wherein said processing includes applying at least one notched filter.

6. The method of claim 1, wherein said analyzing includes performing at least one Fourrier transform.

7. The method of claim 1, wherein said information sufficient to calculate a representative value of a spring constant for the suspension system of the vehicle is obtained by a calibration process including:
   (a) determining a calibration weight supported by the suspension system of the vehicle by an alternative method;
   (b) obtaining measures of vertical motion for the center of mass of the calibration weight over a period of time; and
   (c) analyzing said measures of vertical motion to identify a frequency of vertical oscillation of the calibration weight.

8. A method for determining a total weight supported by the suspension system of a vehicle in motion, the method comprising:
   (a) obtaining information sufficient to calculate a representative value of a spring constant for the suspension system of the vehicle;
   (b) obtaining measures sufficient to determine the vertical motion and at least one rotational motion of at least part of the vehicle over a period of time;
   (c) analyzing said measures to identify a frequency of vertical oscillation of the total weight; and
   (d) determining from said frequency and said information an estimate of the total weight supported by the suspension system of the vehicle.

9. The method of claim 8, wherein said measures are obtained by processing outputs of at least three motion sensors attached to the vehicle.

10. The method of claim 9, wherein said at least three motion sensors include one linear sensor deployed to measure vertical motion information for a part of the vehicle and two angular sensors deployed to measure pitch and roll information for the vehicle.

11. The method of claim 9, wherein said at least three motion sensors include three linear acceleration sensors deployed to measure vertical acceleration at three non-collinear points on the vehicle.

12. The method of claim 9, wherein said processing includes applying at least one notched filter.

13. The method of claim 8, wherein said analyzing includes peforming at least one Fourrier transform.

14. The method of claim 8, wherein said information sufficient to calculate a representative value of a spring constant for the suspension system of the vehicle is obtained by a calibration process including:
   (a) determining a calibration weight supported by the suspension system of the vehicle by an alternative method;
   (b) obtaining measures of vertical motion for the center of mass of the calibration weight over a period of time; and
   (c) analyzing said measures of vertical motion to identify a frequency of vertical oscillation of the calibration weight.

15. A system for determining a total weight supported by the suspension system of a vehicle in motion, the system comprising:
   (a) an arrangement of motion sensors deployable in fixed relation to the vehicle and configured to provide a first output indicative of vertical motion of a first part of the vehicle and at least a second output affected by a rotational movement of the vehicle in a manner different from said first output; and
   (b) a processing system associated with said arrangement of motion sensors and configured to:
      (i) process at least said second output to derive a resonant frequency of rotational oscillation,
      (ii) identify in said first signal a resonant frequency not equal to said resonant frequency of rotational oscillation as a resonant frequency of vertical oscillation, and
      (iii) determine from said resonant frequency of vertical oscillation an estimate of the total weight supported by the suspension system of the vehicle.

16. The system of claim 15, wherein said arrangement of motion sensors includes a rotational sensor for generating said second output.

17. The system of claim 15, wherein said arrangement of motion sensors includes a second vertical motion sensor for generating said second output, said second output being indicative of vertical motion of a second part of the vehicle.

18. The system of claim 15, wherein said arrangement of motion sensors includes there motion sensors including at least one linear motion sensor.

19. The system of claim 15, wherein said processing system is further configured to perform at least one Fourrier transform.

20. The system of claim 15, wherein said processing system is further configured to apply at least one notched filter.

* * * * *